(12) United States Patent
Trudel

(10) Patent No.: US 9,809,965 B1
(45) Date of Patent: Nov. 7, 2017

(54) TOILET HAVING A BUILT-IN ODOR EVACUATING SYSTEM

(71) Applicant: Robert Trudel, Brossard (CA)

(72) Inventor: Robert Trudel, Brossard (CA)

( * ) Notice: Subject to any disclaimer, the term of this patent is extended or adjusted under 35 U.S.C. 154(b) by 0 days.

(21) Appl. No.: 15/151,512

(22) Filed: May 11, 2016

(51) Int. Cl.
*E03D 9/052* (2006.01)
*E03D 5/09* (2006.01)
*E03D 1/00* (2006.01)
*A47K 13/24* (2006.01)
*F16K 1/22* (2006.01)

(52) U.S. Cl.
CPC .............. *E03D 9/052* (2013.01); *A47K 13/24* (2013.01); *E03D 1/00* (2013.01); *E03D 5/09* (2013.01); *F16K 1/221* (2013.01)

(58) Field of Classification Search
CPC .. E03D 9/052; E03D 1/00; E03D 5/09; A47K 13/24; F16K 1/221
USPC ............................................................ 4/351
See application file for complete search history.

(56) References Cited

U.S. PATENT DOCUMENTS

| | | | |
|---|---|---|---|
| 1,972,774 | A | 9/1934 | Hartwell |
| 2,985,890 | A | 5/1961 | Baither |
| 3,568,216 | A | 3/1971 | Vaidespino |
| 3,902,203 | A | 9/1975 | Poinster et al. |
| 4,933,996 | A | 6/1990 | Sowards |
| 4,998,299 | A | 3/1991 | Menge |
| 5,394,569 | A | 3/1995 | Poirier et al. |
| 5,715,543 | A | 2/1998 | Sim |
| 5,991,933 | A | 11/1999 | Schaffer |
| 6,928,666 | B1 | 8/2005 | Schaffer |
| 6,983,491 | B2 | 1/2006 | Curtis et al. |
| 7,275,271 | B1 | 10/2007 | Smith |
| 7,849,526 | B2 | 12/2010 | Smith |
| 8,424,121 | B2 | 4/2013 | Quick |
| 2006/0213001 | A1 | 9/2006 | Mattiello |
| 2007/0234469 | A1* | 10/2007 | Denkewicz ............ E03D 9/052 4/213 |
| 2008/0034482 | A1 | 2/2008 | Lehman |
| 2014/0298576 | A1 | 10/2014 | Chaparro et al. |

FOREIGN PATENT DOCUMENTS

| | | |
|---|---|---|
| CN | 2795314 | 7/2006 |
| JP | H0411821 | 4/1992 |
| WO | WO2013169415 | 11/2013 |

* cited by examiner

*Primary Examiner* — Tuan N Nguyen

(57) ABSTRACT

A toilet having a built-in odor evacuating system has a toilet body wherein a tank portion contains a module further comprised of a turbine member that is powered by a DC motor, and triggered by a motion sensor. The turbine member takes air from openings located inside a bowl portion of the toilet body, and pumps the air through a first pipe, forming part of the module. Once passed the turbine member, the air is directed into a second pipe directing the air into a "P" trap extending integrally from the bowl portion so that odors are blocked by water inside the bowl portion.

8 Claims, 6 Drawing Sheets

TOILET HAVING A BUILT-IN ODOR EVACUATING SYSTEM

FIELD OF THE INVENTION

The present invention relates generally to toilets but more particularly to a toilet having a built-in odor evacuating system.

BACKGROUND OF THE INVENTION

Disagreeable odors are sometimes produced when someone uses the toilet. Bathroom turbines only exasperate the problem by pulling the air up and spreading it before exhausting it after a few minutes. Other deodorizing systems all have shortcomings of one form of other.

SUMMARY OF THE INVENTION

In view of the foregoing disadvantages inherent in the known devices now present in the prior art, the present invention, which will be described subsequently in greater detail, is to provide objects and advantages which are:

To provide for a a toilet having a built-in odors evacuating system.

In order to do so, the invention comprises a toilet body wherein a tank portion contains a module further comprised of a turbine member that is powered by a DC motor, and triggered by a motion sensor. The turbine member takes air from openings located inside a bowl portion of the toilet body, and pumps the air through a first pipe, forming part of the module. Once passed the turbine member, the air is directed into a second pipe directing the air into a "P" trap extending integrally from the bowl portion so that odors are blocked by water inside the bowl portion. The built-in odors evacuating system operates according to the following steps:

a) Before use, a butterfly valve is closed, and a lever is in a first position and connected to the butterfly valve.

b) When a user sits on a toilet seat, the motion sensor is triggered which actuates a servo motor which moves the lever into a second position, which also opens the butterfly valve, and actuates the turbine member which is powered by a low voltage DC motor, so that air is sucked in directly from the bowl portion by way of the openings.

c) When a user presses on a four function flush button, the servo motor turns the lever into a third position position which pulls on a chain, which pulls a plug open so as to flush the toilet; simultaneously, the lever closes the butterfly valve; the servo motor continues rotating the lever, briefly reopening the butterfly valve until the lever reaches its original first position, which closes the butterfly valve so as to prevent any siphoning effect from water going down, passed the "P" trap, and the second pipe.

In a preferred embodiment, the first pipe has an inner volume substantially larger than that of the second pipe so as to achieve low air velocity for any given CFM so as to prevent water creeping.

In yet another embodiment, the motion sensor is triggered only when the lid cover is up while a donut member is down.

In still another embodiment, a four function flush button is coupled with a PCB so as to control:

a) a first level CFM from the turbine member;
b) a second CFM level higher than the first level CFM from the turbine member;
c) actuating the servo motor to initiate a flushing action; an on/off switch.

Preferably the first level produce 13 CFM, and the second level produces 15 CFM.

There is also a manual flush handle.

In still another embodiment, the motion sensor operates by way of a combination of a hall effect sensor and a magnet so as to create an on/off switch.

Optionally an LED lights up the bowl member in low light conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiment and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiment of the invention.

DETAILED DESCRIPTION

Figure 1:
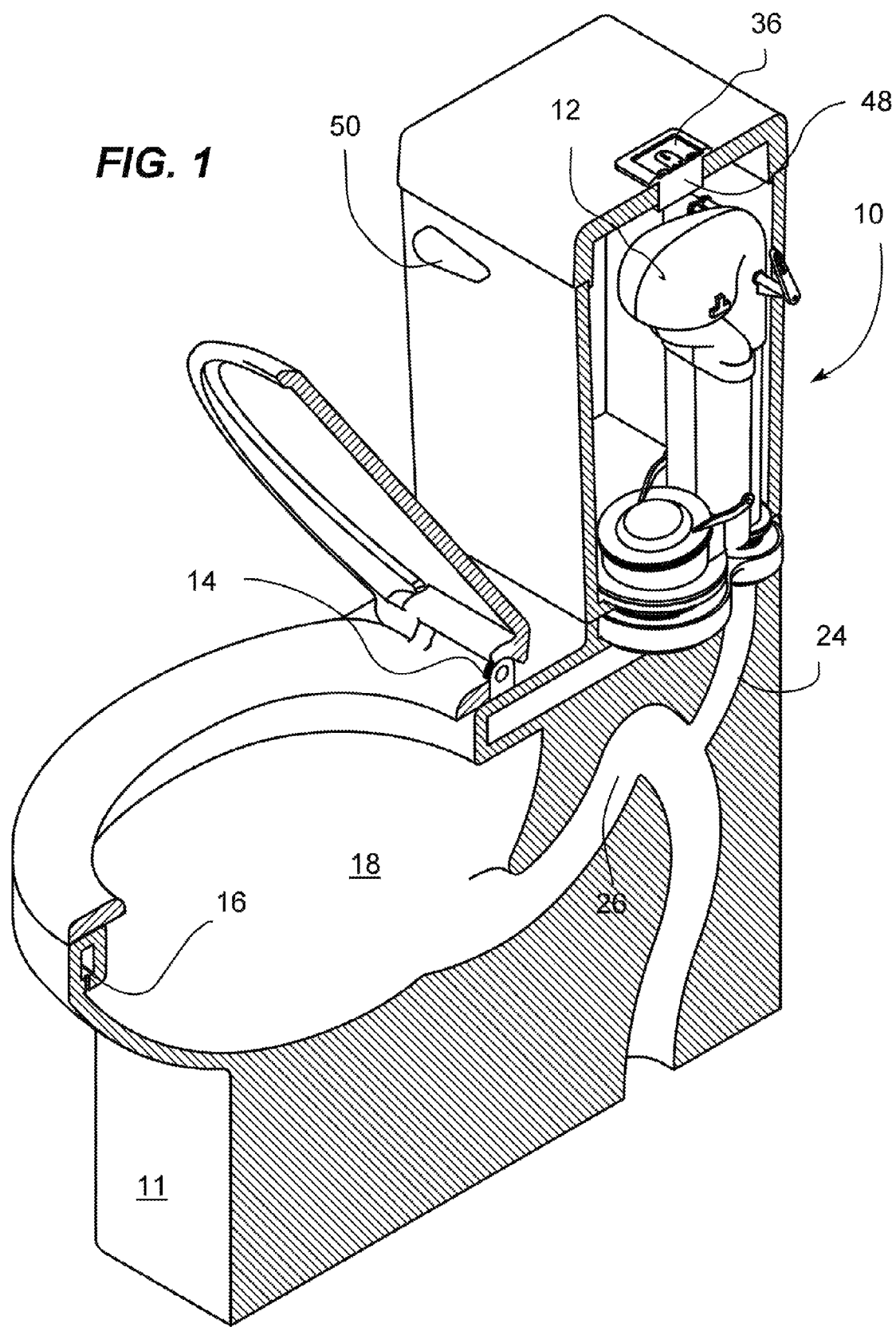
FIG. 1 Isometric cutaway view of the invention with a custom toilet.

A built-in odor evacuating system (10) is comprised of a toilet body (11) wherein a tank portion (13) contains a module (12) further comprised of a turbine member (22) that is powered by a DC motor (not shown) and triggered by a motion sensor (14). The turbine member (22) takes air from openings (16) located inside a bowl portion (18) of the toilet body (11), and pumps it through a first pipe (20), forming part of the module (12). Once passed the turbine member (22), it is pushed into a second pipe (24) which directs the air into a "P" trap (26) extending integrally from the bowl portion (18) so that the odors are blocked by the water inside the bowl portion (18).

Figure 2C:
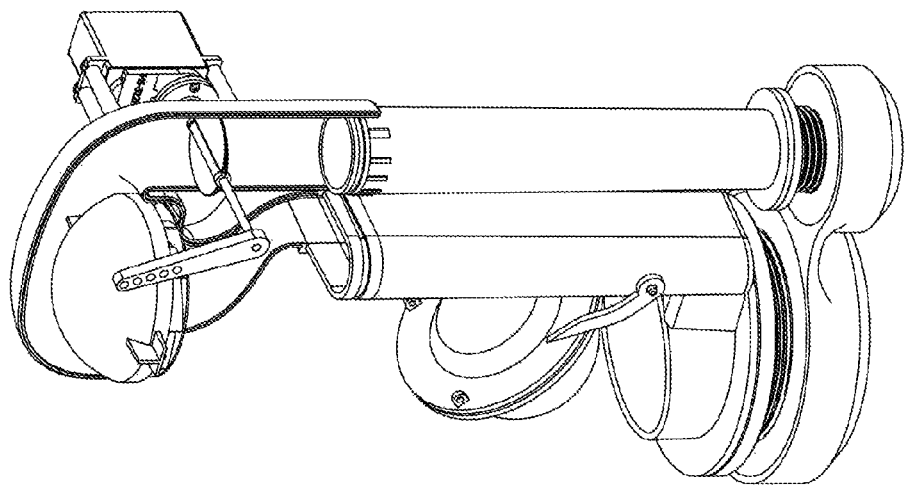
FIGS. 2A-C Isometric see through view showing the sequence of operation.
Figure 2B:
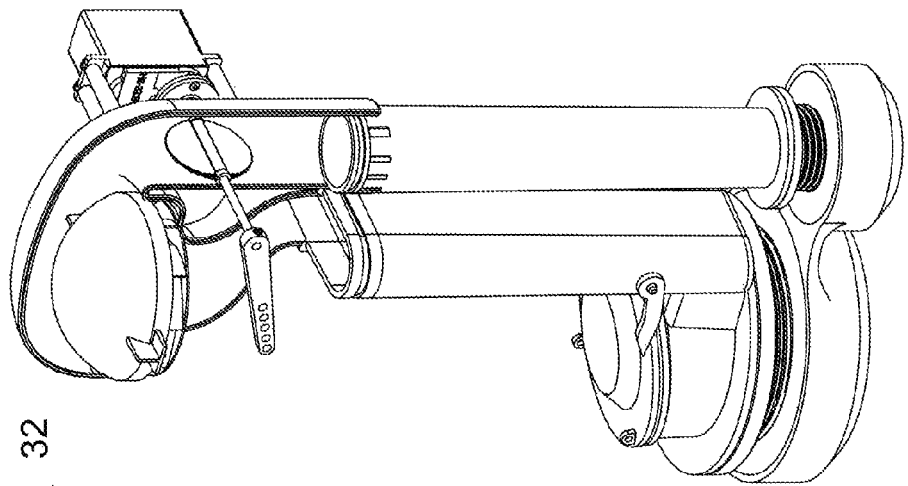
Figure 2A:
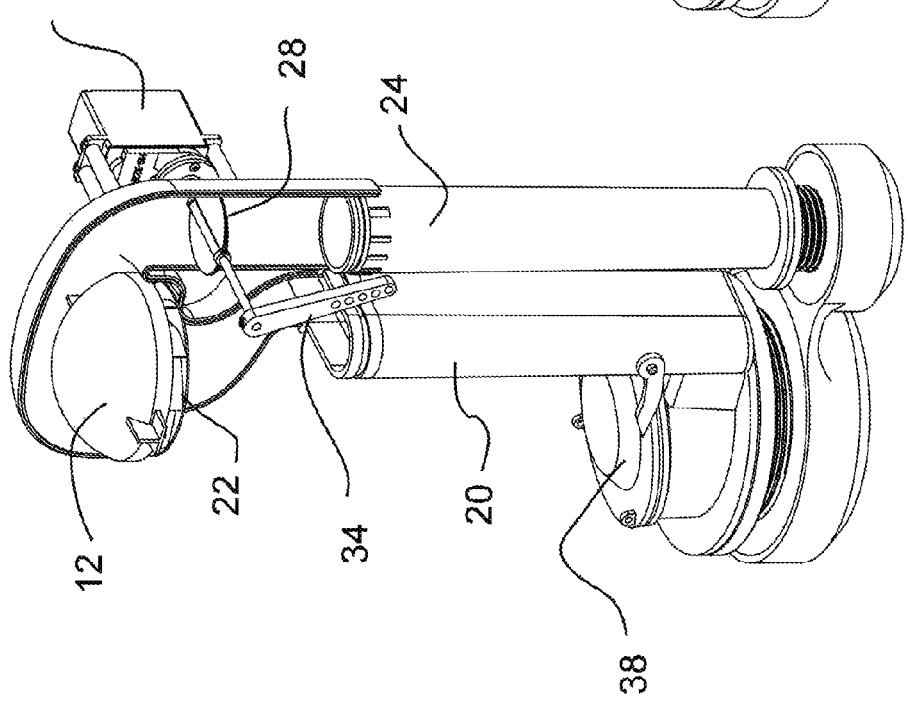
Figure 3:
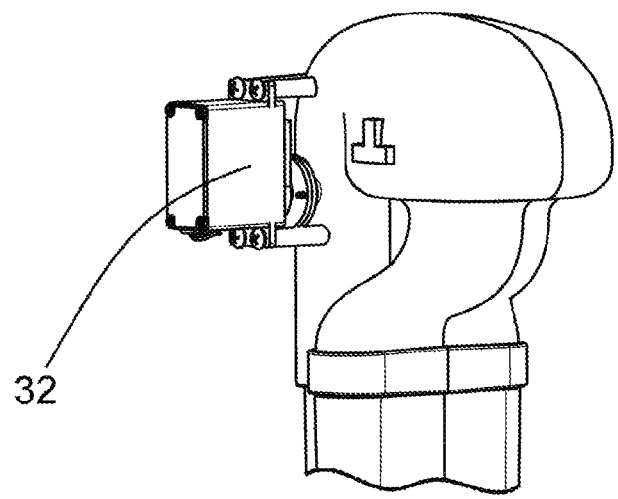
FIG. 3 Isometric view favoring the servo motor.
Figure 4:
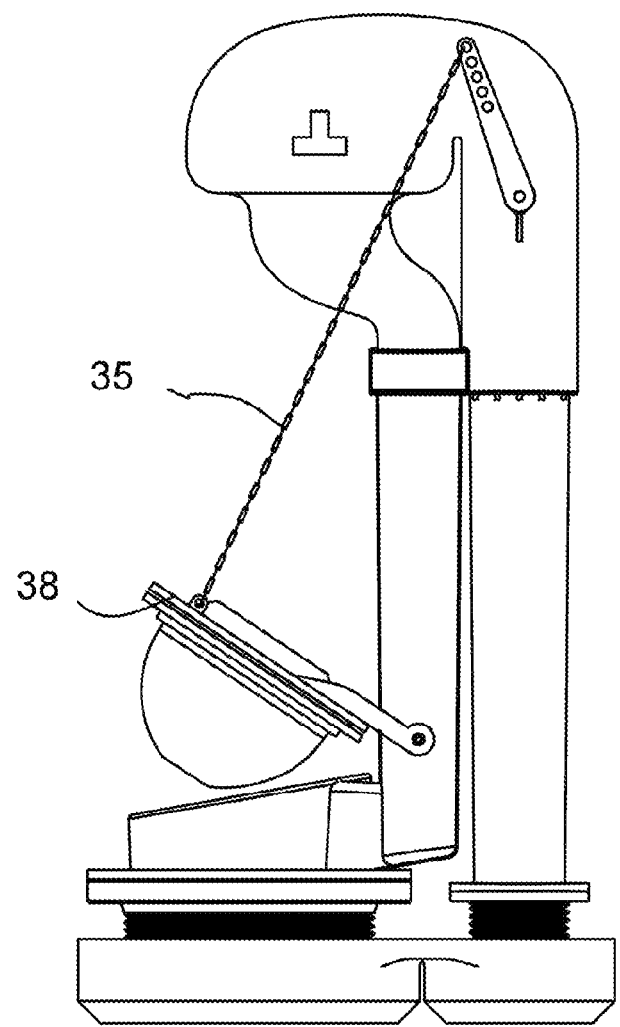
FIG. 4 Side view of the invention with the plug open.
Figure 5:
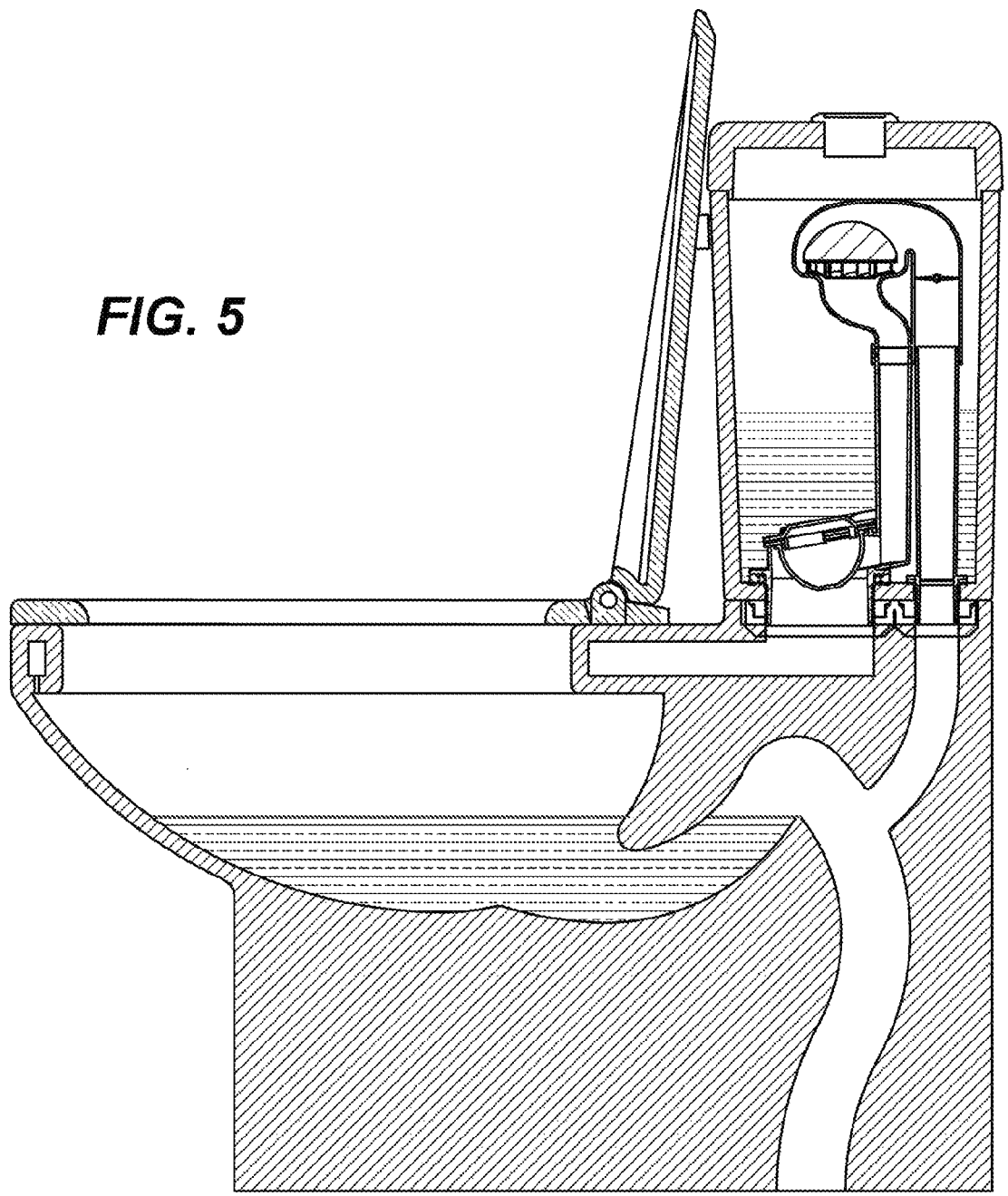
FIG. 5 Side cutaway view of the invention.
Figure 6A:
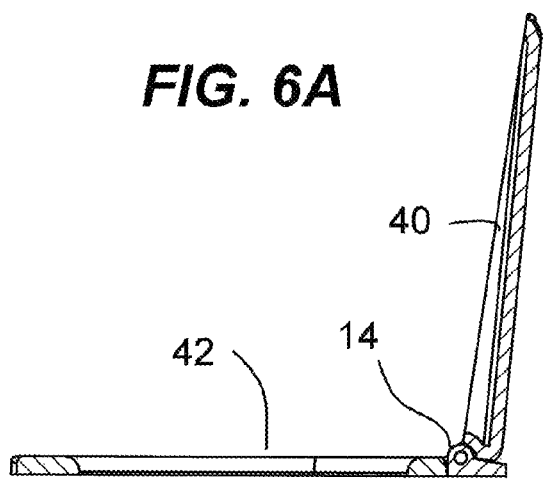
FIGS. 6A-F Various views and configurations of the toilet seat with motion sensor.
Figure 6B:
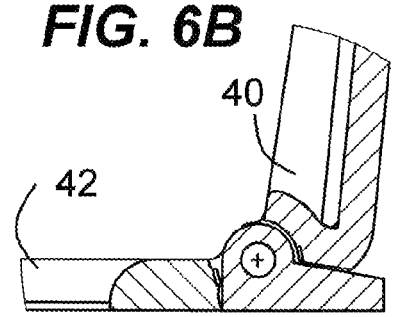
Figure 6C:
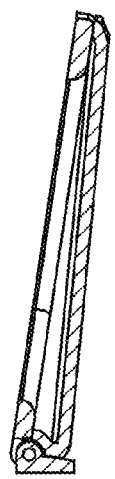
Figure 6D:
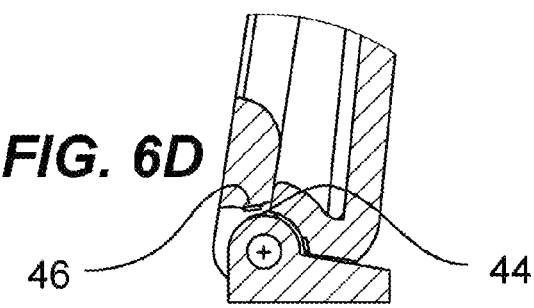
Figure 6E:
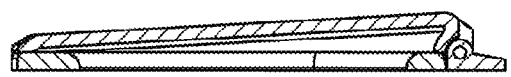
Figure 6F:
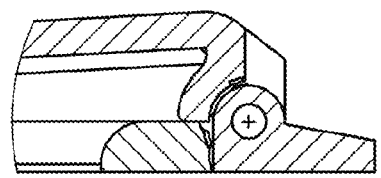
Figure 7:
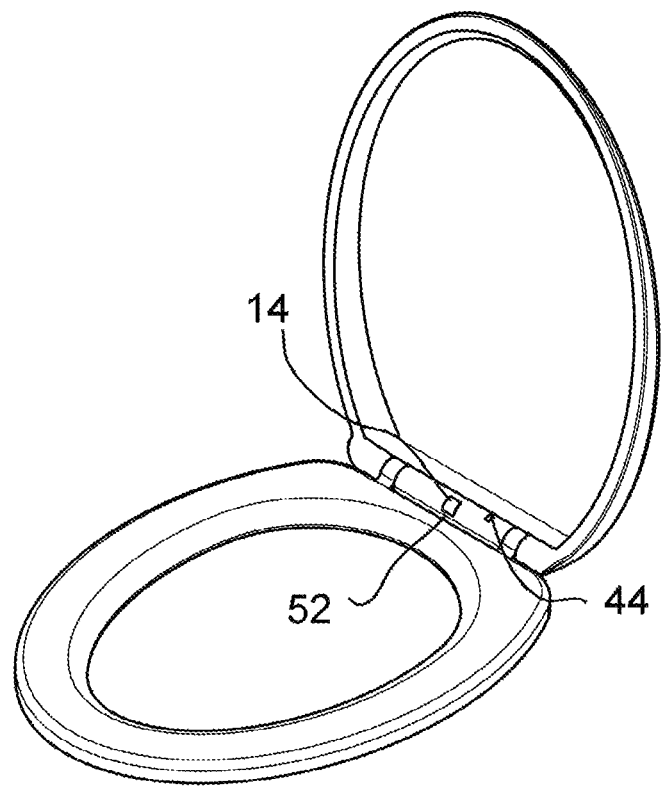
FIG. 7 Isometric view of the toilet seat.

When not in use, the system (10) is in the configuration of FIG. 2A wherein a butterfly valve is closed. When a user (not shown) sits on a toilet seat (30), the motion sensor (14) is triggered which actuates a servo motor (32) which moves a lever (34) into a horizontal position (FIG. 2B) which also opens the butterfly valve (28), and actuates the turbine member (22), powered by a low voltage DC motor (not shown), so that air is sucked in directly from the bowl (18) by way of the openings (16), which are the same openings used by water when flushing, as is known in the art of toilets. When a user presses on a four function flush button (36). The servo motor (32) turns the lever (34) into a vertical position which pulls on a chain (35), which pulls a plug (38) open, as per FIGS. 2C and 4, so as to flush the water. At the same time, the lever closes the butterfly valve (28). The servo motor (32) continues rotating the lever (34), briefly reopening the butterfly valve (28) until it reaches its original closed configuration as per FIG. 2A so as to prevent any siphoning effect from the water going down, passed the "P" trap (26) and the second pipe (24).

The first pipe (20) has an inner volume substantially larger than that of the second pipe (24) so as to achieve low air velocity for any given CFM. This low velocity prevents any water from creeping up from it and into turbine member (22) because the air uses the same conduits (openings (16) as the water.

The motion sensor (14) is only triggered when the lid cover (40) is up while the donut (42) is down. In any other instances, the motion sensor (14) is blocked and therefore is inoperative. A combination of a hall effect sensor (44) and a magnet (46) create an on/off switch for the motion sensor (14).

The four function flush button (36) is coupled with a PCB (48) in order to control: 1) a low 13 CFM from the turbine member (22) 2) a higher 15 CFM from the turbine member (22) 3) toilet flushing 4) an on/off switch when cleaning or servicing the toilet (11).

A standard manual flush handle (50) can be used if a user prefers, or in the event of a power failure.

It is understood that there is wiring between the motion sensor (14), the PCB (48), the servo motor (32), and a power source, generally house current, although an optional battery could form part of the electrical circuit in case of power outage. This type of electrical circuit is well known in the art of electrical wiring and its details need not be discussed herein.

An additional feature is the use of an LED (52) under the motion sensor (14) for use at night time.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A built-in odors evacuating system comprising a toilet body wherein a tank portion contains a module further comprised of a turbine member that is powered by a DC motor, and triggered by a motion sensor; said turbine member taking air from openings located inside a bowl portion of said toilet body, and pumping said air through a first pipe, forming part of said module; once passed said turbine member, said air being directed into a second pipe directing said air into a P-trap extending integrally from said bowl portion so that odors are blocked by water inside said bowl portion; said built-in odors evacuating system operating according to the following steps:
   a) before use, a butterfly valve is closed, and a lever is in a downward position and connected to said butterfly valve;
   b) when a user sits on a toilet seat, said motion sensor is triggered which actuates a servo motor which moves said lever into a horizontal position, which also opens said butterfly valve, and actuates said turbine member which is powered by a low voltage DC motor, so that air is sucked in directly from said bowl portion by way of said openings;
   c) when a user presses on a four function flush button, said servo motor turns said lever into an upward position which pulls on a chain, which pulls a plug open so as to flush said toilet; simultaneously, said lever closes said butterfly valve; said servo motor continues rotating said lever, briefly reopening said butterfly valve until said lever reaches its original downward position, which closes said butterfly valve so as to prevent any siphoning effect from water going down, passed said P-trap, and said second pipe.

2. The built-in odors evacuating system of claim 1 wherein said first pipe has an inner volume substantially larger than that of said second pipe so as to achieve low air velocity for any given CFM so as to prevent water creeping.

3. The built-in odors evacuating system of claim 1 wherein said motion sensor being triggered only when said lid cover is up while a donut member is down.

4. The built-in odors evacuating system of claim 1 wherein a four function flush button is coupled with a PCB so as to control:
   a) a first level CFM from said turbine member;
   b) a second CFM level higher than said first level CFM from said turbine member;
   c) actuating said servo motor to initiate a flushing action; an on/off switch.

5. The built-in odors evacuating system of claim 4 wherein said first level produce 13 CFM, and wherein said second level produces 15 CFM.

6. The built-in odors evacuating system of claim 1 wherein there is a manual flush handle.

7. The built-in odors evacuating system of claim 3 wherein said motion sensor operates by way of a combination of a hall effect sensor and a magnet so as to create an on/off switch.

8. The built-in odors evacuating system of claim 1 wherein an LED lights up said bowl member in low light conditions.

* * * * *